United States Patent [19]

Pellow

[11] Patent Number: 5,090,968
[45] Date of Patent: Feb. 25, 1992

[54] PROCESS FOR THE MANUFACTURE OF FILAMENTARY ABRASIVE PARTICLES

[75] Inventor: Scott W. Pellow, Niagara Falls, Canada

[73] Assignee: Norton Company, Worcester, Mass.

[21] Appl. No.: 638,705

[22] Filed: Jan. 8, 1991

[51] Int. Cl.$^5$ .............................................. B04D 11/00
[52] U.S. Cl. ....................................... 51/293; 51/309; 264/177.11; 264/211.22
[58] Field of Search .................. 51/293, 309; 264/211.11, 177.11; 426/516, 517, 518, 503, 560, 451, 456, 457; 425/308, 312, DIG. 230

[56] References Cited

U.S. PATENT DOCUMENTS

| | | | |
|---|---|---|---|
| 2,904,827 | 1/1955 | Kaiser et al. | 425/312 |
| 2,915,475 | 12/1959 | Bugosh | 252/313.2 |
| 2,917,426 | 12/1959 | Bugosh | 162/145 |
| 3,387,957 | 6/1968 | Howard | 51/298 |
| 3,808,015 | 4/1974 | Seufert | 106/65 |
| 4,623,364 | 11/1986 | Cottringer et al. | 51/309 |
| 4,799,938 | 1/1989 | Junz et al. | 51/293 |
| 5,009,676 | 4/1989 | Rue et al. | 51/309 |

FOREIGN PATENT DOCUMENTS 2055356 7/1983 United Kingdom .

OTHER PUBLICATIONS

*Properties of Filaments Sintered From Boehmite Gels*, Badkar et al. Dec. 1971, Univ. of Surey, pp. 193-201.
*The Preparation and Properties of Polychrystalline Aluminum Oxide Fibers*, Birchall, Trans. J. Br. Ceram. Soc., pp. 143-145, 1983.
*The Production and Properties of Polycrystalline Alumina Rods and Fibers*, Blakelock et al., Northfield Laboratories, London, pp. 69-83, Nov. 1966.

*Primary Examiner*—Mark L. Bell
*Assistant Examiner*—Deborah Jones
*Attorney, Agent, or Firm*—David Bennett

[57] ABSTRACT

A device and process is disclosed for producing filamentary abrasive particles having substantially equal aspect ratios without further length reduction.

20 Claims, 1 Drawing Sheet

PROCESS FOR THE MANUFACTURE OF FILAMENTARY ABRASIVE PARTICLES

BACKGROUND OF THE INVENTION

This invention relates to a process and device for the manufacture of filamentary abrasive particles having controllable and preferably substantially constant aspect ratios.

Abrasive materials such as filamentary abrasive particles and grits are widely used in the production of abrasive devices such as grinding wheels, segments, belts, disks, polishing powders and the like. All of these materials require the use of very high temperatures in their manufacture. Sol-gel alpha alumina abrasive materials, in particular, have recently become more widely used in bonded abrasive products. Sol-gel aluminous abrasives have demonstrated advantages over other abrasive materials such as those described above. Such sol-gel abrasives are generally made by forming a hydrated alumina gel which may also contain varying amounts of additives such as MgO or $ZrO_2$ and then drying and sintering the gel. See for example, U.S. Pat. No. 4,314,827.

Seeded sol-gel abrasives such as those formed by the conversion of hydrated alumina to alpha alumina using a seed material have also become very useful in making abrasive materials, particularly coated abrasives. See for example, U.S. Pat. No. 4,623,364.

Once a gel has been created, it may be shaped by any convenient method such as pressing, molding, or extruding and then carefully dried to produce an uncracked body of the desired shape. If abrasive material is desired, the dried extruded gel material is usually crushed or broken by suitable means such as a hammer or ball mill to form abrasive particles or grains. The same type of extrusion, grinding, and forming processes may be used with other abrasive forming compositions than sol-gel materials. See for example, U.S. Pat. No. 3,387,957 which discloses the production of elongated geometrical shaped and controlled grit size aluminous abrasive materials by means of extrusion.

The problem with the filamentary abrasive particles produced by the conventional extrusion, drying, and cutting techniques, be they prepared from a gel or from other abrasive materials, is that they usually have a wide distribution of aspect ratios. As used herein, "aspect ratio" refers to the ratio between the length along the principal or longer dimension and the greatest extent of the filamentary particle along any dimension perpendicular to the principle dimension. Where the cross-section is other than round, e.g. polygonal, the longest measurement perpendicular to the lengthwise direction is used in determining the aspect ratio. The filamentary particles in the distribution with extremely high aspect ratio values create problems, especially during coated abrasive manufacturing processes. Extremely long filamentary particles can result in shorting out of an electrostatic field which is often used during the coating process. Also, during sizing operations (in which a layer of adhesive is applied by a rotation roller on top of the filamentary particles) extremely high aspect ratio materials often are either pushed over by the roller or become embedded in the rubber of the rollers. In addition, the high aspect ratio materials often fracture, resulting in a build-up of grit on the roller and reduction in the actual aspect ratio of the grits in the product.

DISCLOSURE OF THE INVENTION

According to the present invention there is disclosed a process and device for producing filamentary abrasive particles having substantially regular shapes and controllable aspect ratios. As used herein, "filamentary abrasive particles" refers to generally elongated ceramic products having a substantially uniform cross-sectional shape perpendicular to the greatest dimension, i.e. the bodies each have a generally constant cross-sectional shape along their lengths and have an aspect ratio of 1:1 or greater, generally of about 1:1 to 25:1. More preferable aspect ratios are from about 2:1 to about 8:1. Most preferable aspect ratios are from about 2:1 to about 4:1. The filamentary abrasive particles of this invention may be bent or twisted so that the length is measured along the body rather than necessarily in a straight line. The process generally comprises forcing an aqueous dispersion of an abrasive material through a continuously moving belt having a multiplicity of perforations therein while the belt is in motion at a substantially constant rate so as to form filamentary particles of substantially constant length. The filamentary particles are formed of an aqueous dispersion of an abrasive material which dispersion is inherently sufficiently sticky to cause the particles to stick together if allowed to contact one another and which enables them to remain adhered to the belt after their formation. They are treated to render them non-sticky while still being adhered to the belt and then removed from the belt, preferably as the belt travels around a loop. The filamentary particles are fired either before removal from the belt but more preferably after removal. The filamentary abrasive particles which result may undergo conventional processing to form the finished abrasive particles, such as sintering, coating, irradiating, annealing, where appropriate. The filamentary abrasive particles may then be formed into final shaped bodies such as bonded abrasives, coated abrasives, and the like.

The process of this invention permits the production of filamentary abrasive particles, particularly very fine filamentary abrasive particles, having regular shapes and having controllable aspect ratios without requiring length reduction. Filamentary abrasive particles of substantially the same shape and aspect ratio are produced in a single process operation without sticking together in clumps and generally without the need for further processing steps such as cutting, screening, or the like.

DESCRIPTION OF THE PREFERRED EMBODIMENTS

Figure 1:
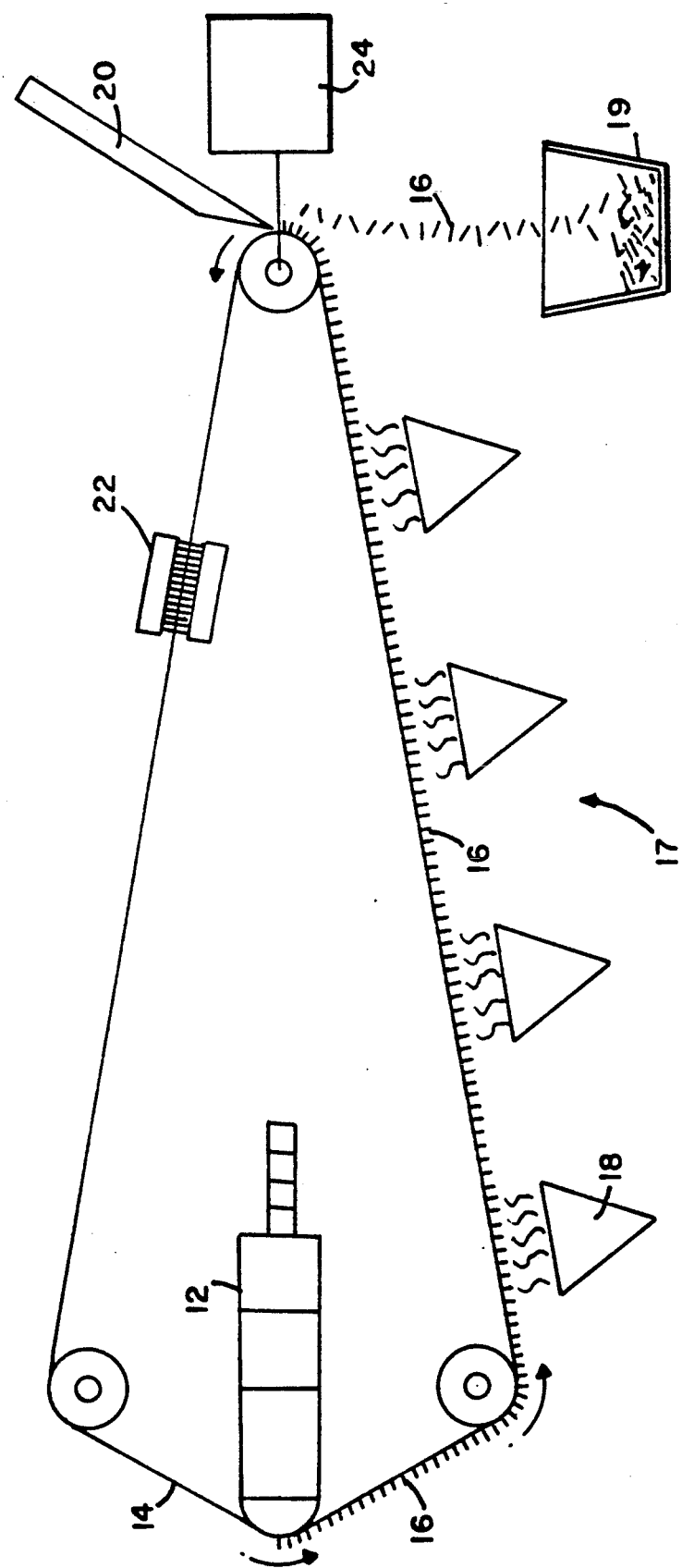
FIG. 1 is a schematic view of one embodiment of the process of the present invention and associated manufacturing device.

As best shown in the drawings, a preferred process of the present invention comprises forcing an extrudable gel of an aqueous dispersion of an abrasive material using a forcing means 12 such as a piston extruder (shown) through a continuous, perforated belt loop 14, while the belt is in motion and as it moves past the forcing means 12 while in tight register therewith. Filamentary particles 16 are thereby formed which are inherently so sticky that they would adhere to each other if permitted to make contact. The filamentary particles adhere to the belt loop as it moves away from the forcing means 12. This is an important feature of the invention, since the filamentary particles are formed from aqueous dispersions such as sol-gels which are usually soft and sticky as they are extruded through the belt loop and would inherently stick together if allowed to contact each other, i.e. if they fell off the belt loop, at this stage of the process. Instead, the filamentary particles stay on the belt loop and are then treated to make then non-sticky, preferably dried or de-watered by drying in a drying section 17 by drying means 18 such as hot air blowers positioned downstream of the forcing means 12. As used herein, "downstream" means a position in the direction of the forward motion of the belt loop 14. Also, keeping the filamentary particles apart until they are no longer adherent to each other permits use of lower percent solids dispersions. This in turn facilitates the use of smaller openings in the belt loop, resulting in the production of very fine grit sizes without the need for classification. Also the lower solids enables the use of lower pressures when employing an extruder as the forcing means 12. Filamentary particles may be produced having a wide range of grit sizes. The process of the invention is however particularly adapted to the production of filamentary particles at grit sizes below 50, preferably below 80, and as fine as 325 grit. The average diameters of such grits in (i) the wet state as extruded and (ii) after firing at about 1230°-1300° C. for 5-10 minutes is:

TABLE 1

| GRIT | DIAMETER (MICRONS) | |
| --- | --- | --- |
| Size | Extruded (Wet) | Fired |
| 50 | 584 | 310 |
| 80 | 280 | 170 |
| 120 | 215 | 120 |
| 180 | 145 | 75 |
| 220 | 125 | 65 |
| 325 | 85 | 45 |

The treating means is preferably a drying means which may be any suitable means such as a drying chamber, hot air blowers, radiant heaters, microwaves, dry air or gas, or a water-extracting solvent. Alternatively, the treating means can be a coating means which coats the surfaces of the filamentary particles with a very fine dust. Suitable such dusts for alumina filamentary particles include alpha alumina or boehmite, since these materials will not be deleterious to the eventual use of the particles. After belt loop 14 with the filamentary particles thereon passes by or through the treating means, the treated filamentary particles are removed from the belt loop by a removing means 20 located downstream of the drying means. Suitable removing means 20 include such as a doctor blade (shown), wire, brush, air blast or other suitable means.

The filamentary particles removed from the belt loop are collected in collecting means 19, fired (sintered) in accordance with conventional techniques known in the art and, if necessary, screened to remove dust. The filamentary particles so produced are finished, loose grain materials, which do not require further cutting to length with each filamentary particle having substantially the same aspect ratio, provided that the pressure exerted by the forcing means was substantially constant across its entire face.

After the filamentary particles are removed for final processing the belt loop continues around its path. While not always required, the belt loop may pass through a cleaning means 22 such as a rotating brush (shown) so as to remove any remaining abrasive material and thereby avoid any clogging problems. Suitable cleaning means include vacuum, stiff wire brushes, water solvent jets, ultrasound, and air blasts.

The forcing means 12 is preferably an extruder such as a horizontal piston extruder, an auger extruder, or other devices such as a pump, doctor blade or roller. As shown, the forcing means is positioned immediately adjacent to and in tight register with the belt loop 14. In the case of an extruder such as a horizontal piston extruder, the belt loop is stretched across the exit slot of the extruder so that the abrasive material that exits the extruder passes immediately through the perforated belt loop.

The belt loop 14 may be made of any suitable material such as stainless steel or other acid and high temperature resistant material. The perforations in the belt loop may be obtained by using a wire mesh of the desired opening size or by using punched hole, laser cut, chemically etched, or electro-etched sheets. Alternatively, the belt may be a "sacrificial" belt which is used a single time and not repeatedly as in a continuous loop. The perforations in the belt may be of any size or shape depending upon the desired size and shape of the filamentary particles to be produced. For example, the perforations may be designed to produce generally cylindrical filamentary particles after firing having a diameter of from about 45 to about 400 microns or to produce filamentary particles of various other shapes including having square, rectangular, triangular, and star shaped cross sections. Generally the perforations are spaced such that the particles do not touch each other while adhered to the belt. On the other hand, the spacing should not be so great that the internal pressure of the forcing means is excessive. It is found that suitable belts generally contain from about 20 to about 40% of perforations in the surface area. Usually about 30% of the belt surface area is represented by the perforations.

The length and thereby the aspect ratio of the filamentary abrasive particles may be controlled by controlling the velocity at which the belt loop moves; the greater the velocity the lower the aspect ratio of the filamentary particles. The belt loop may be driven by any suitable means 24 such as a motor or the like which may be regulated to control the belt loop velocity and thereby the aspect ratio of the filamentary particles. Generally the belt loop travels at a rate of from about 0.5 to about 10 feet per minute, though different speeds may be used depending upon the equipment design and the desired length of the extruded filamentary particles. Provided (i) the belt loop travels at a steady rate during a forcing run, (ii) each of the perforations is of equivalent size, and (iii) the pressure is constant across the entire face of the forcing means the aspect ratio of the filamentary particles produced during that run will all be substantially the same.

In addition, the aspect ratio of the filamentary abrasive particles is dependent on the delivery rate of the dispersion to the orifice of the forcing means. This in turn is controlled by the pressure of the extruder, the pH and the solids content of the aqueous dispersion being processed. Higher delivery rates will produce greater aspect ratios, as will lower solids content. Generally pressures of about 2 to about 500 psi or more will be used with those compositions having a higher solids content requiring the higher pressures. In general the dispersions preferably have a solids content of about 40 to about 60% by weight.

While the device of the present invention is suitable for use with numerous types of abrasive slurries which contain a temporary binder to hold the extrudates together prior to drying and sintering, it is particularly suitable for use with sol-gel and seeded sol-gel abrasive dispersions such as those disclosed in U.S. Pat. Nos. 4,314,827 and 4,623,364, the subject matter of which is incorporated herein by reference. Such sol-gel materials are generally formed from a hydrated alumina gel which may contain additives such as MgO or ZrO. Preferably, such gels will contain about 40 to 55% solids which has been found to produce very fine filamentary abrasive particles without requiring excessive pressures. The use of such relatively low solids gels with a conventional extrude, dry, and cut to size, process is generally avoided due to the extrudates sticking together before drying. Other abrasive materials such as silicon carbide, zirconium oxide, boron carbide and alumina based materials such as those obtained from bauxite, may be used provided that the composition extruded is sufficiently adherent to the belt, either naturally or due to the presence of additives.

While the process of the present invention has been described with reference to certain specified operations that are performed along the motion of the belt, other operations may be carried out. For example, if it is desired to produce surface treated filamentary particles either for rendering them non-sticky or for some other purpose, a suitable surface treatment means may be positioned before the removing means.

What is claimed is:

1. A process for producing filamentary abrasive particles of substantially constant aspect ratio and a diameter less than 600 microns which comprises (i) forcing by means of a forcing means an aqueous dispersion of an abrasive material at a fixed rate through an orifice and through a multiplicity of perforations in a belt which moves across and in tight registry with said orifice to form filamentary particles which are sufficiently sticky as to cause the particles to stick together if brought into contact with one another and remain attached to said belt, (ii) treating said filamentary particles to render them non-sticky while they remain attached to said belt, (iii) thereafter firing the treated filamentary particles at a temperature that is sufficient to form sintered filamentary abrasive particles.

2. The process of claim 1, wherein the belt moves at a speed such that the perforations therein are in register with said orifice for essentially the same period of time so as to produce filamentary particles of essentially the same length.

3. The process of claim 2, wherein the period of time is sufficiently short that the filamentary particles produced are of a length wherein further length reduction is not done.

4. The process of claim 2, wherein the perforations each have essentially the same size so as to produce filamentary particles having a substantially constant aspect ratio.

5. The process of claim 4, wherein the abrasive filaments have an aspect ratio of from about 1:1 to about 1:25.

6. The process of claim 1, wherein the treating to render non-sticky comprises at least partially drying the filamentary particles.

7. The process of claim 1, wherein the treating to render non-sticky comprises coating the surfaces of the filamentary particles with a powder.

8. The process of claim 1, wherein the aqueous dispersion is a gel.

9. The process of claim 8, wherein the gel has a solids content of about 40 to 55%.

10. The process of claim 8, wherein the gel comprises alumina.

11. The process of claim 1, wherein the treated filamentary particles are removed from the belt loop prior to firing using a removing mean while the belt is in motion.

12. The process of claim 1, wherein the belt is a continuous belt loop.

13. The process of claim 1, wherein the filamentary abrasive particles after firing have a diameter of about 45 to about 400 microns.

14. The process of claim 1, wherein the belt moves at a velocity of from about 0.5 to about 10 feet per minute.

15. The process of claim 1, wherein the belt is a continuous loop and, after passing by the removing means, passes through a cleaning means for cleaning any remaining abrasive material from the belt loop.

16. The process of claim 1, wherein the forcing means is an extruder.

17. The process of claim 16, wherein the extruder is a horizontal piston extruder.

18. The process of claim 16, wherein the extruder is operated at a pressure of about 2 to about 500 psi.

19. A process for producing filamentary abrasive particles which comprises the steps of (i) forcing by means of a forcing means a gel of an aqueous dispersion of an abrasive material through an orifice and through a multiplicity of perforations in a continuous belt loop which moves across and in tight register with said orifice at a substantially constant rate to form filamentary particles which are sufficiently sticky that the particles would stick together if brought in contact with each other and remain attached to said belt loop and move with the belt loop, (ii) treating said filamentary particles while adhered to the belt loop to render them non-sticky to each other, (iii) removing the treated filamentary particles from the belt loop, and (iv) firing the treated filamentary particles to form filamentary abrasive particles, and wherein the portion of the belt loop from which the dried filamentary particles are removed thereafter passing through a cleaning means for removing any abrasive material from the belt loop before that portion of the belt loop again passes by the forcing means.

20. The process of claim 19, wherein (i) the perforations each have essentially the same size and the belt moves at a speed such that the perforations therein are in register with said orifice for essentially the same period of time so as to produce filamentary particles of essentially the same length and having a substantially constant aspect ratio, (ii) the period of time is sufficiently short that the filamentary particles produced are of a length wherein further length reduction is not done, and (iii) the treating to render non- sticky is at least partially drying.

* * * * *